(12) United States Patent
Thomas

(10) Patent No.: US 6,967,583 B1
(45) Date of Patent: Nov. 22, 2005

(54) SYSTEMS AND METHODS FOR INDICATING EVENTS IN A POWER DISTRIBUTION SYSTEM

(76) Inventor: Kirk S. Thomas, 1013 Glenwood Way, Escondido, CA (US) 92026

( * ) Notice: Subject to any disclaimer, the term of this patent is extended or adjusted under 35 U.S.C. 154(b) by 769 days.

(21) Appl. No.: 09/709,575

(22) Filed: Nov. 13, 2000

Related U.S. Application Data

(60) Provisional application No. 60/164,772, filed on Nov. 12, 1999.

(51) Int. Cl.[7] .............................................. G08B 21/00
(52) U.S. Cl. ................. 340/635; 340/310.01; 340/657; 361/601
(58) Field of Search ............................ 340/310.01, 635, 340/310.02, 310.03, 310.06, 310.07, 815.49, 641, 650, 652, 653, 654, 657, 661; 361/5, 6, 21, 600, 601

(56) References Cited

U.S. PATENT DOCUMENTS

| | | | | |
|---|---|---|---|---|
| 3,777,217 A | * | 12/1973 | Groce et al. .................. | 361/96 |
| 5,302,857 A | * | 4/1994 | Charles et al. ................ | 307/20 |
| 5,959,537 A | * | 9/1999 | Banting et al. ............. | 340/664 |
| 6,122,157 A | * | 9/2000 | Gerlach ...................... | 361/124 |

\* cited by examiner

*Primary Examiner*—Toan Pham
(74) *Attorney, Agent, or Firm*—Jackson Patent Law Office

(57) ABSTRACT

Disclosed are systems and methods for indicating events at various locations in a power distribution system.

26 Claims, 8 Drawing Sheets

SYSTEMS AND METHODS FOR INDICATING EVENTS IN A POWER DISTRIBUTION SYSTEM

BACKGROUND OF THE INVENTION

This Application claims the benefit of Application Ser. No. 60/164,772 of KIRK S. THOMAS filed Nov. 12, 1999 for SYSTEMS AND METHODS FOR RECORDING EVENTS IN A POWER DISTRIBUTION SYSTEM, the contents of which are herein incorporated by reference.

FIELD OF THE INVENTION

This invention relates generally to power distribution systems and, more particularly, to systems and methods of detecting and recording conditions at various locations in a power distribution system throughout a wide geographic area.

DESCRIPTION OF RELATED ART

Malfunctions in power distribution systems are often accompanied by transient current surges in certain locations of the system. To isolate and diagnose a malfunction, technicians may be dispatched to inspect various locations in the system. Because the current surges may be transient, however, these surges cannot be used as a diagnostic clue without equipment to record the occurrence of these surges.

SUMMARY OF THE INVENTION

It is an object of the present invention to provide a diagnostic having relatively high reliability and relatively low cost.

To achieve this and other objects of the present invention, there is a method for a power distribution system including a generation station and a plurality of control circuits each located away from the generation station, each control circuit including a first device with first and second control inputs, and a current output, a second device with a control input and a current output, and a third device with a control input and a current output for coupling to a light source. The method comprises the steps, performed for each control circuit, of detecting a current at a respective location in the power distribution system; supplying voltage to the control circuit, in response to the detecting step, and the steps, performed a plurality of times in the control circuit, of charging the second control input of the first device; subsequently using the current output of the first device to charge the control input of the second device; and using the current output of the second device to charge the control input of the third device.

According to another aspect of the present invention, there is a method for a power distribution system having a plurality of conduction paths, and a plurality of devices each having a manual control and each located adjacent a conduction path. The method comprises the steps, performed in each device, of detecting a current in the adjacent conduction path; activating an indicator in response to the detecting step; and deactivating the indicator after a period of time, the period of time being a function of the manual control.

According to yet another aspect of the present invention, a power distribution system has a plurality of conduction paths, and a plurality of devices. Each device includes a first node for coupling to a first reference voltage; a second node for coupling to a second reference voltage; a detector that detects a current in an adjacent conduction path to generate a first signal; an activator, responsive to the first signal, for generating a second signal; a control circuit that generates a third signal in response to the second signal; an indicator responsive to the third signal; and a deactivator for blocking the second signal after a period of time, the deactivator including a capacitor coupling between the first and second nodes.

According to yet another aspect of the present invention, there is circuitry for a power distribution system including a generation station and a plurality of first circuits each located away from the generation station, each first circuit including a first device with first and second control inputs, and a current output, a second device with a control input and a current output, and a third device with a control input and a current output for coupling to a light source. The circuitry comprises means for detecting a current at a respective location in the power distribution system; means for supplying voltage to a first circuit, in response to the means for detecting, and the following elements, activated a plurality of times for the first circuit: means for charging the second control input of the first device; means for subsequently using the current output of the first device to charge the control input of the second device; and means for using the current output of the second device to charge the control input of the third device.

According to yet another aspect of the present invention, there is an indication system for a power distribution system including a generation station, the indication system comprising a plurality of first circuits each located away from the generation station. Each first circuit comprises a first device with first and second control inputs, and a current output; a second device with a control input and a current output, and a third device with a control input and a current output for coupling to a light source; a detector that detects a current at a respective location in the power distribution system; a voltage supply, responsive to the detector; a charger that charges the second control input of the first device; a first current path between the current output of the first device and the control input of the second device; and a second current path between the current output of the second device and the control input of the third device.

According to yet another aspect of the present invention, there is circuitry for a power distribution system having a plurality of conduction paths, and a plurality of devices each having a manual control and each located adjacent a conduction path, wherein the manual control in each device includes a switch, each device further includes a capacitor. The circuitry comprises means for detecting a current in the adjacent conduction path; means for activating an indicator in response to the detecting means; and means for deactivating the indicator after a period of time, the period of being a function of the manual control, the deactivating means acting to charge the capacitor through the switch.

According to yet another aspect of the present invention, there is a device for a power distribution system having a plurality of conduction paths. The device comprises a first node for coupling to a first reference voltage; a second node for coupling to a second reference voltage; a detector that detects a current in an adjacent conduction path to generate a first signal; an activator, responsive to the first signal, for generating a second signal; a control circuit that generates a third signal in response to the second signal; an indicator responsive to the third signal; and a deactivator for blocking the second signal after a period of time, the deactivator including a capacitor coupling between the first and second nodes.

According to yet another aspect of the present invention, there is a method for a power distribution system having a plurality of conduction paths. The method comprises coupling a first node to a first reference voltage; coupling a second node to a second reference voltage; detecting a current in an adjacent conduction path to generate a first signal; activating, responsive to the first signal, to generate a second signal; generating a third signal in response to the second signal; indicating responsive to the third signal; and blocking the second signal after a period of time, by using a capacitor coupled between the first and second nodes.

According to yet another aspect of the present invention, there is circuitry for a power distribution system having a plurality of conduction paths. The circuitry comprises means for coupling a first node to a first reference voltage; means for coupling a second node to a second reference voltage; means for detecting a current in an adjacent conduction path to generate a first signal; means for activating; responsive to the first signal, to generate a second signal; means for generating a third signal in response to the second signal; means for indicating responsive to the third signal; and means for blocking the second signal after a period of time, by using a capacitor coupled between the first and second nodes.

Figure 1:
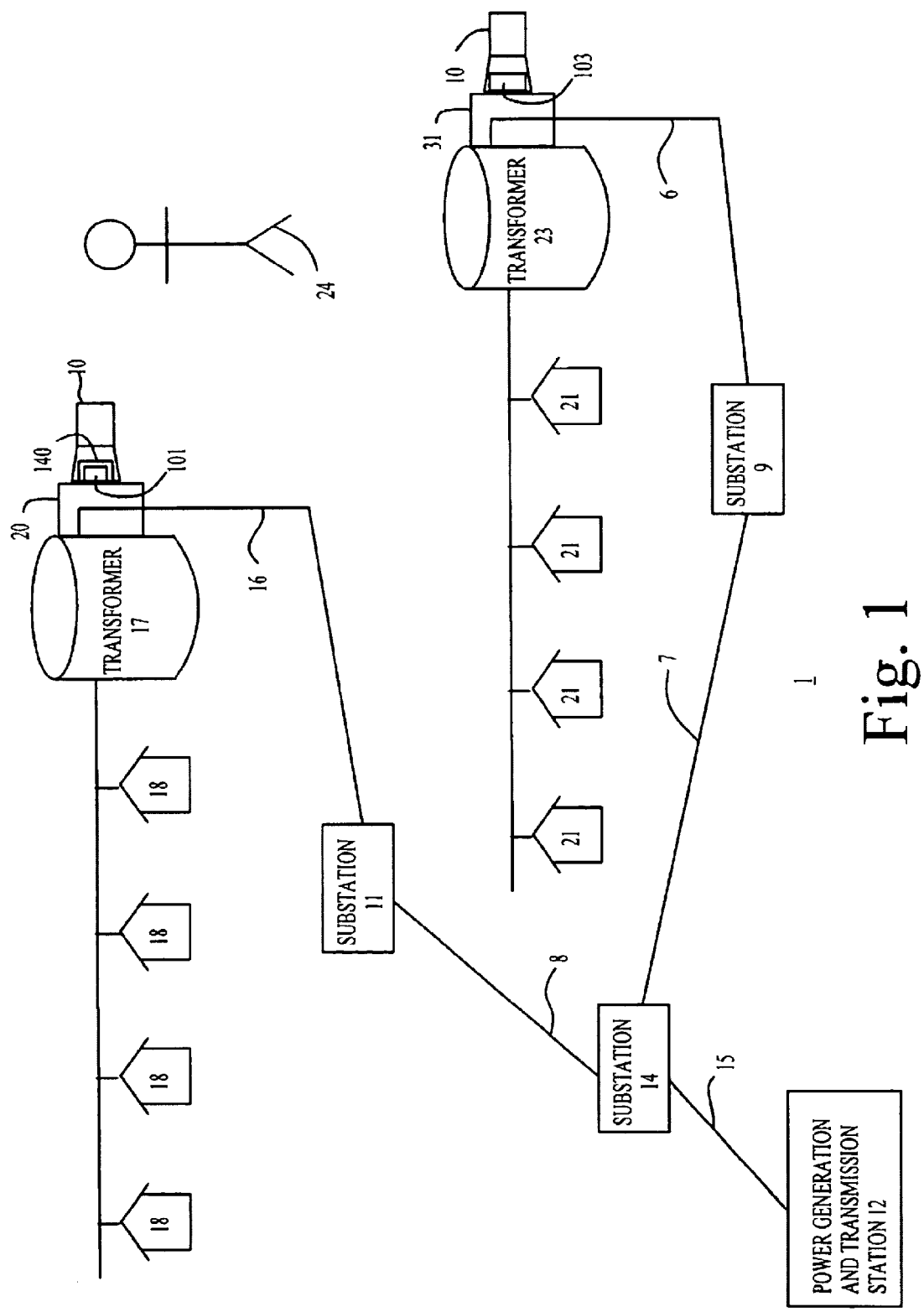
FIG. 1 is a diagram of a power distribution system employing a recording device in accordance with a preferred embodiment of the invention.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers. Certain elements in the drawings may have exaggerated size for clarity of description; elements are not necessarily drawn to scale.

DESCRIPTION OF THE PREFERRED EMBODIMENTS

FIG. 1 shows the United States power distribution system 1 configured with electrical recordation device 10 in accordance with a preferred embodiments of the present invention. Power generation and transmission station 12 may be a hydroelectric power station, a fuel burning power station, or a wind power station, for example. Station 12 generates a high voltage power signal and transmits the signal over transmission lines 15, 8, and 7; and substations 14, 11, and 9. Substations 14, 11, and 9 act to step down the voltage generated by station 12. Substation 11 sends a power signal to transformer 17 via cable 16. Transformer 17 steps down the voltage received on cable 16 and transmits a 110 VAC power signal to homes 18.

Substation 9 sends a power signal to transformer 23 via cable 6. Transformer 23 steps down the voltage received on cable 6 and transmits a 110 VAC power signal to homes 21.

In the event of a current surge in an adjacent conductor, such as cable 16 or cable 6, a recordation device 10 detects the surge and, in response to the detected surge, illuminates light 22 for a period of time, typically several hours. Thus, technician 24, who is inspecting various parts of distribution system 1, may observe the illumination of light 22 and be thus informed of the current surge that occurred on cable 16.

Figure 2:
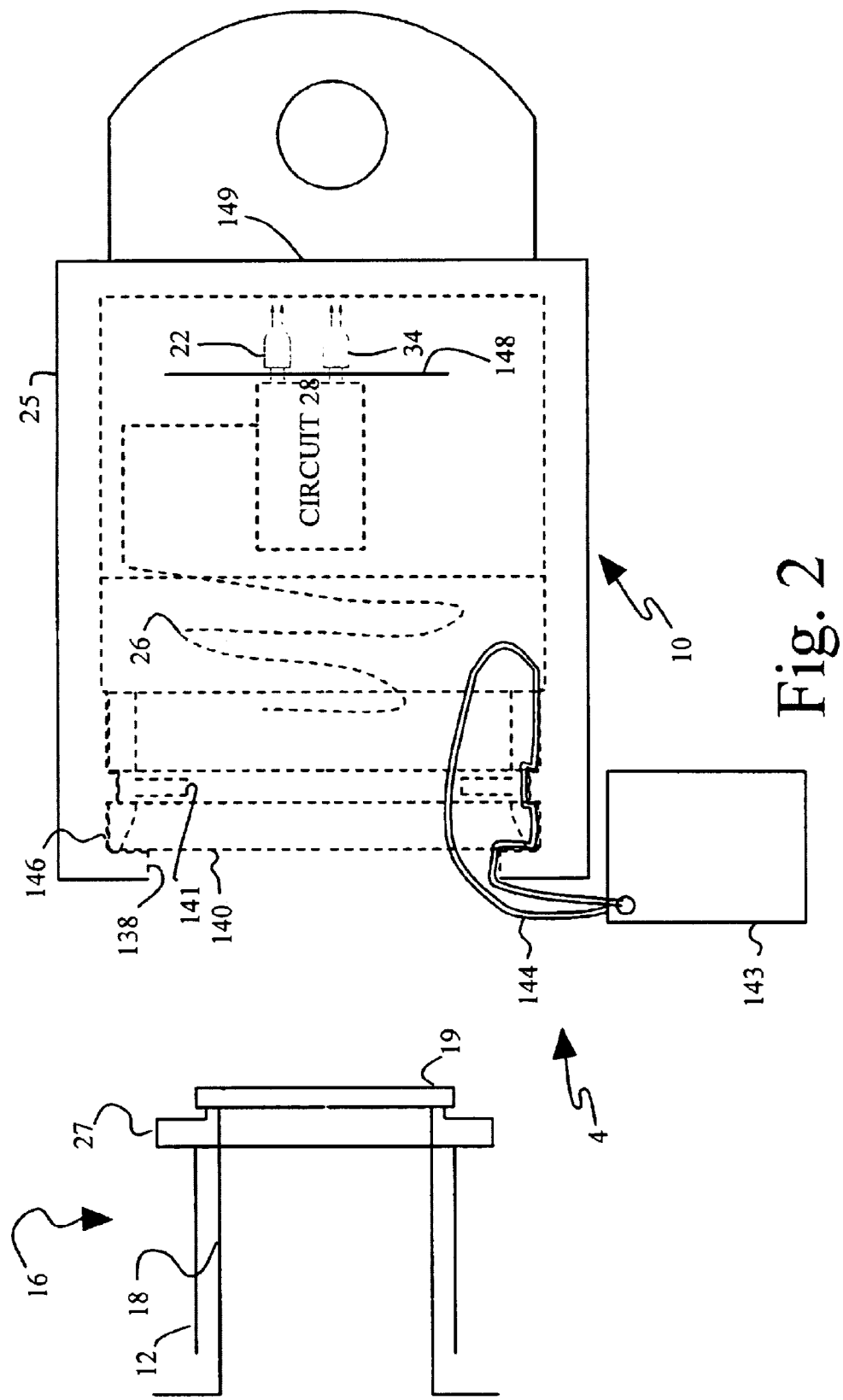
FIG. 2 is a diagram emphasizing an installation assembly in the preferred system.

FIG. 2 shows installation assembly 4, including recordation device 10, annular insert 140, label 143, and string 144 looped through label 143 and looped through the ring defined by insert 140. String 144 is depicted with an exaggerated width.

Test point terminal 101 in on a conventional transformer connector widely used in the United States. Test point terminal 101 includes a projection 27 of insulating member 29 protruding from connector 20. Embedded in test point terminal 101 is an electrically conductive contact 18 having an annular outer flange portion 19 exposed at the outer end of the terminal to provide an electrical connection to the contact and an inner portion in proximity to conductor 16 to capacitively couple circuitry 28 to cable 16. Inner flange 141, of insert 140, is a resilient rubber material for connecting over test point 101. In other words, flange 141 acts to mechanically couple device 10 to a transformer connector; flange 141 acts to mechanically couple device 10 to power cable 16.

Figure 3:
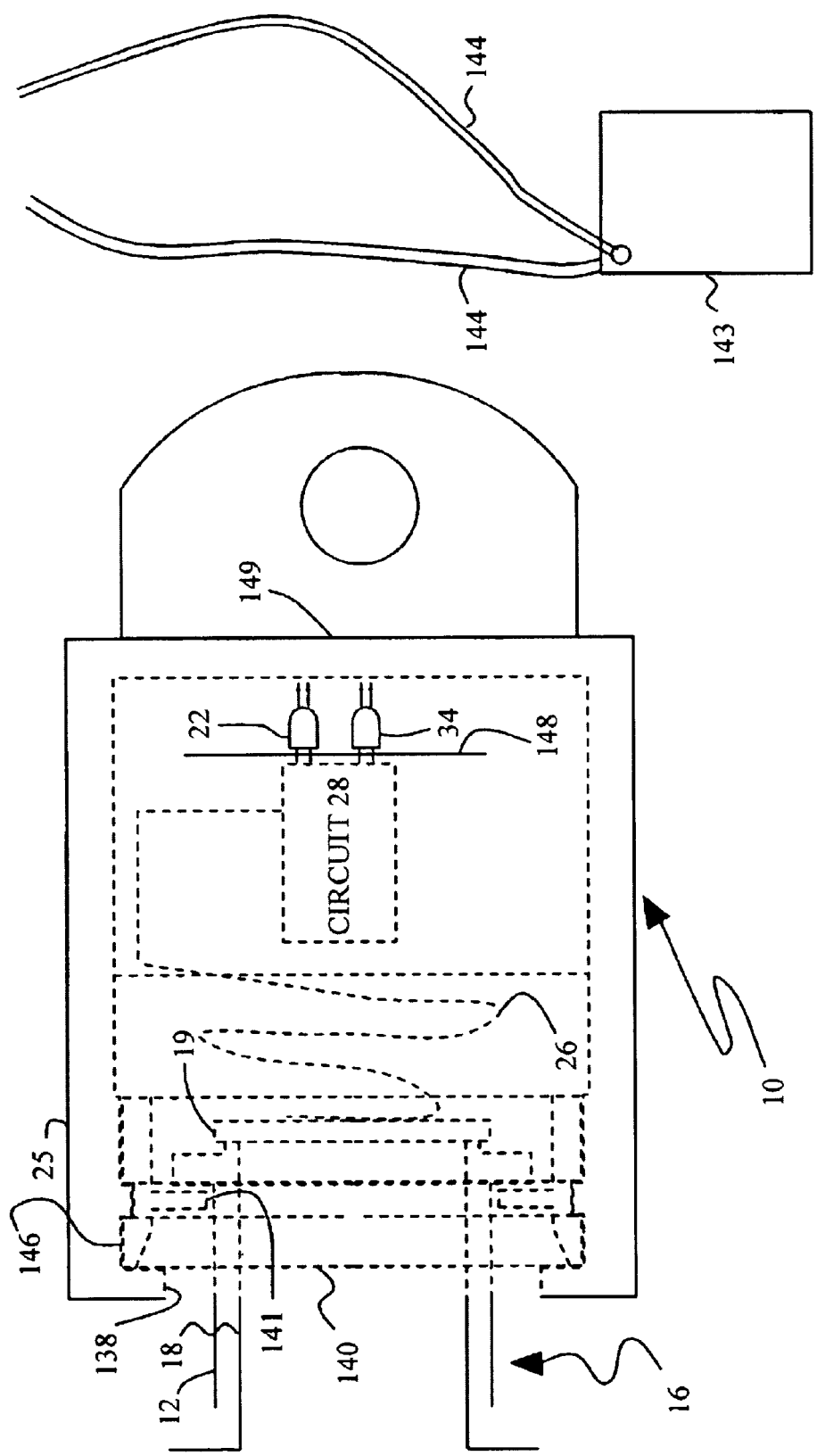
FIG. 3 is diagram for describing installation of the recording device on a type of test point terminal.

Inner flange 141 is spaced to snap over projection 27 of test point terminal 101. Thus, to install device 10 on terminal 101, technician 24 cuts string 144, and pulls string 144 out of device 10, while leaving insert 140 in device 10. Subsequently, as shown in FIG. 3, technician 24 secures device 10 over terminal 1 01. When device 1 0 is installed on the test point terminal 1 01, the annular flange 141 of insert 140 snaps over an exterior annular rib 27 on terminal 101. Technician 24 may then discard label 143 and string 144.

Device 10 includes housing 25. Housing 25 defines a cavity that accommodates annular rib 27 and annular contact 19 of test point 16. Metallic spring 26 is in the cavity and is electrically connected to circuit 28 in housing 25. When device 10 is mechanically coupled to the test point in the transformer connector, spring 26 is electrically coupled to a contact 19 (FIG. 5) in the transformer connector.

Reflective surface 148 is in housing 25. Housing 25 defines transparent window 149. Lights 22 and 34 are between reflective surface 148 and transparent window 149, thereby facilitating viewing of lights 22 and 34.

Figure 4:
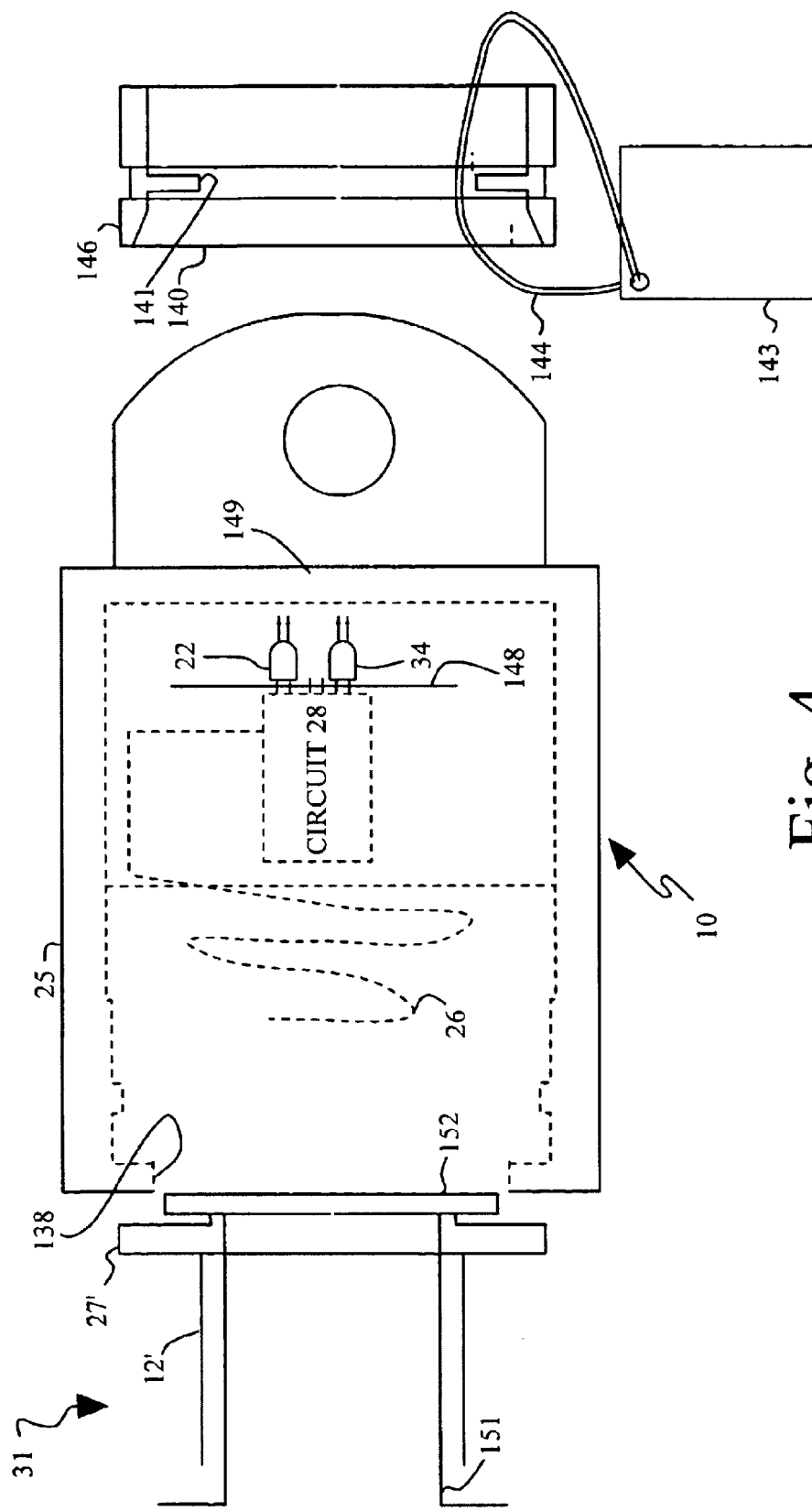
FIG. 4 is a diagram for describing installation of the recording device on another type of test point terminal.

FIG. 4 represents installation of device 10 on terminal 103 of connecter 31 widely used in the United States. Embedded in test point terminal 103 is an electrically conductive contact 151 having an annular outer flange portion 152 exposed at the outer end of the terminal to provide an electrical connection to the contact and an inner portion in proximity to conductor 16 to capacitively couple circuitry 28 to cable 16. Inner flange 141 of insert 140 is too narrow to fit over projection 27' of terminal 103. Flange 138, of housing 25, is a resilient rubber material for connecting over a test point 103. Thus, to install device 10 on terminal 103, technician 24 removes insert 140 by pulling string 144. Subsequently, technician 24 installs device 10 on terminal 103 by snapping flange 138 over projection 27'. Technician 24 may then discard label 143, string 144, and insert 140.

Figure 5:
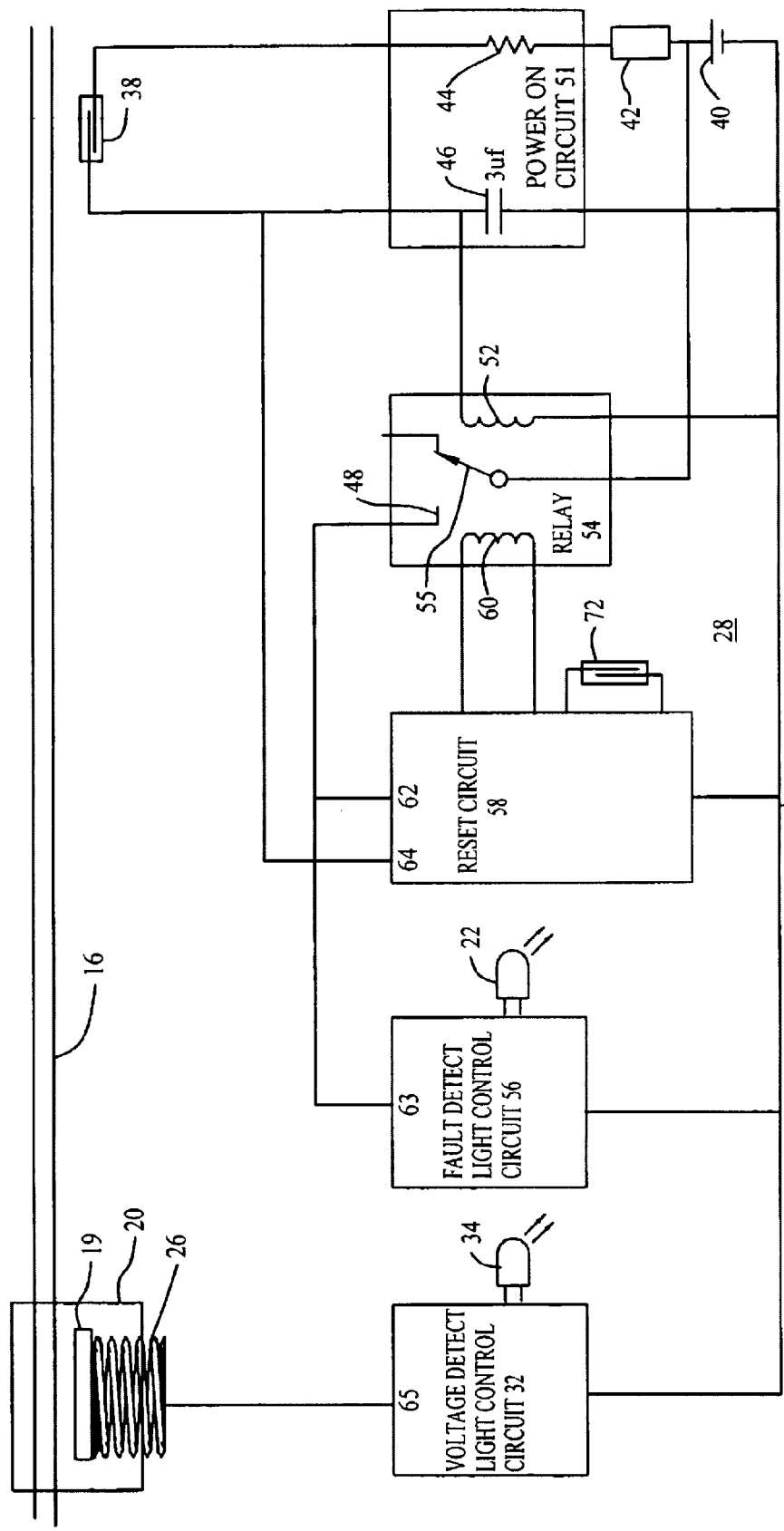
FIG. 5 is a diagram emphasizing a circuit in the preferred recording device.

FIG. 5 shows circuit 28 coupled to transformer connector 20. Contact 19, of connector 20, is in proximity to cable 16 such that contact 19 is capacitively coupled to cable 16. Thus, voltage detect light control circuit 32 is capacitively coupled to cable 16. Thus, when power is present on cable 16, circuit 32 sends a signal to neon bulb 34 to illuminate bulb 34. Thus, a technician can observe bulb 34 to determine whether cable 16 is powered.

On the occurrence of a current surge on cable 16, magnetic reed switch 38 effectively detects the excessive current in cable 16 and switch 38 thus closes for the duration of the surge. The duration of the surge is typically in a range 0.001 to 10 seconds.

This closure of switch 38 allows current flow from 3.6 volt lithium battery 40 through 10 ohm resistors 44 and set coil 52 of relay 54. In response to the current flow through set coil 52, relay armature 55 moves to touch contact 48, thereby supplying power from battery 40 to fault detect light control circuit 56 and reset circuit 58.

In response to receiving power on Vcc input 63, circuit 56 illuminates light emitting diode 22, allowing a technician to observe that an event occurred on cable 16.

After a period of time, reset circuit 58 energizes reset coil 60, causing armature 55 to break contact with contact 48, thereby removing the power supply by battery 40. Typically, reset circuit 58 will activate itself several hours after circuit 58 receives power on Vcc input 62. Thus, device 10 effectively records the presence of the current surge.

Discreet 3 µf capacitor 46 is coupled to set coil 52 to enhance the sensitivity of circuit 28. Thus, detecting a current surge includes charging capacitor 46 and passing current from capacitor 46 to set coil 52. The value of capacitor 46 was chosen to minimize the duration of current surge, on cable 16, necessary to activate relay armature 55.

Thermal switch 42 will open if, for some reason, current has been flowing for too long a period. Thus, thermal switch 42 acts a safety precaution.

Figure 6:
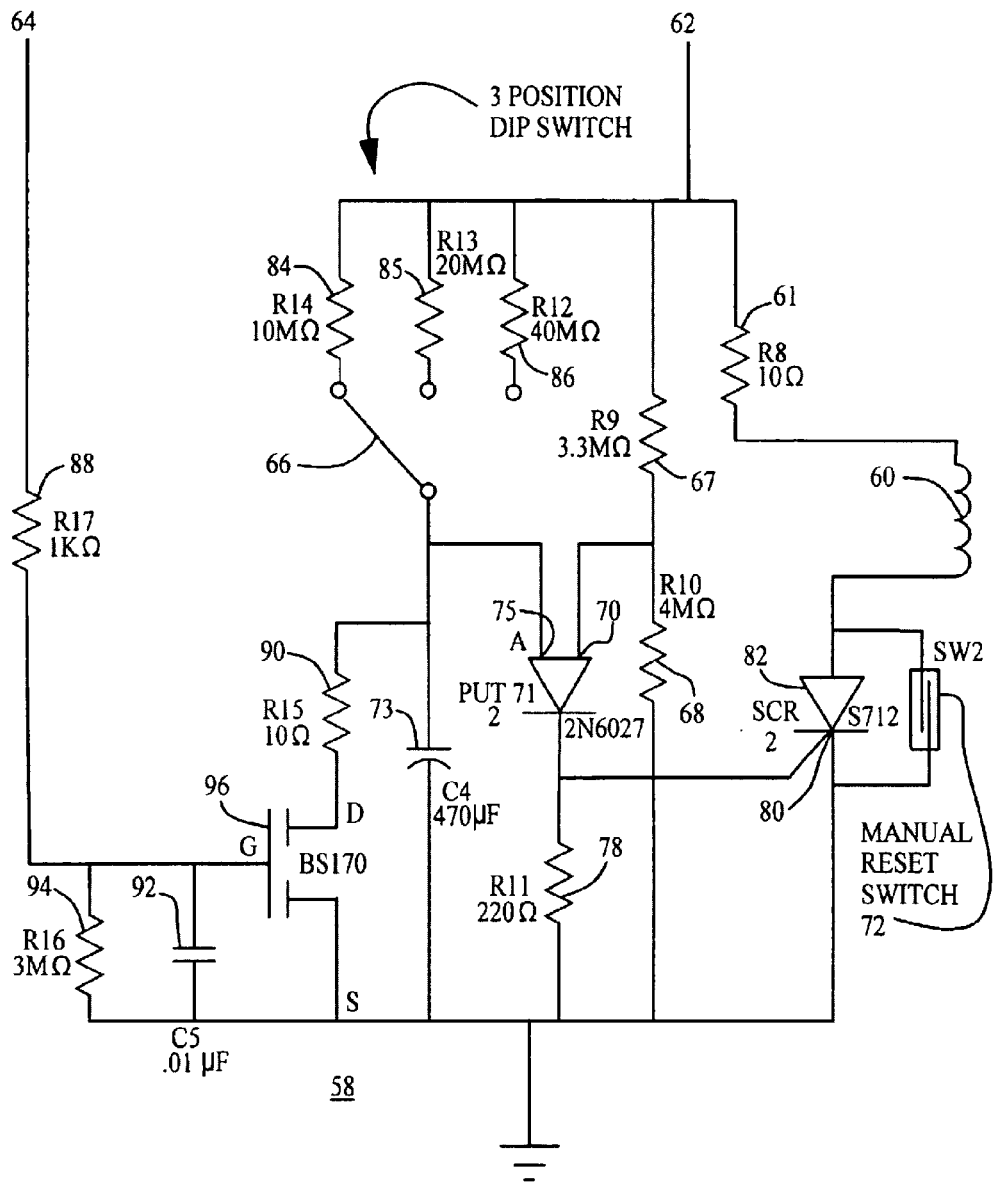
FIG. 6 is a diagram showing part of the circuit of FIG. 5 in more detail.

FIG. 6 shows reset circuit 58 in more detail. When circuit 58 receives power on power Vcc input 62, resistors 67 and 68 act as a voltage divider to supply a reference voltage to gate 70 of programmable unijunction transistor 71.

When circuit 58 receives power on Vcc input 62, the voltage on anode input 75 of transistor 71 rises, as capacitor 73 receives current via 3 position dip switch 66; and one of resistors 84, 85, 86. When the voltage on anode 75 reaches a certain value relative to the voltage on gate input 70, transistor 71 turns on, to supply a control signal to gate 80 of silicon control rectifier 82. Silicon control rectifier 82 thus turns on allowing current to flow through reset coil 60 of relay 54. Thus, reset circuit 58 acts to disconnects battery 40 from light control circuit 56, a period of time after a surge occurs on cable 16, thereby extinguishing light 22.

The display period for light 22 may be programmed by setting manual dip switch 66 to select one of the 3 resistors 84, 85, or 86 to vary the charging time for capacitor 73.

Thus, reed switch 38, relay 54, and capacitor 46 act to detect a current in an adjacent conduction path, such as cable 16. Circuit 56 activates light 22 in response to this detection. Circuit 58 acts to deactivate light 22 after a period of time, the period of time being a function of the position of manual switch 66.

To keep the display period for light 22 consistent, it may be desirable to discharge capacitor 73 between surges. More specifically, when reset circuit 58 activates to energize reset coil 60, residual voltage may remain on capacitor 73. If another surge occurs before capacitor 73 naturally discharges, the display period for light 22 will be shorter than normal. Thus, circuit 58 includes resistor 88, field effect transistor (FET) 96, capacitor 92, resistor 94, and resistor 90 for initializing circuit 58, by discharging capacitor 73. When reed switch 38 closes, switch 38 applies power from lithium battery 40 to initialization input 64, causing current to flow through resistor 88 to charge capacitor 92. FET 96 thus turns on, allowing capacitor 73 to discharge through resistor 90. Resistor 94 acts to discharge capacitor 92, and FET 96, therefore, is kept on for approximately 1 second.

Figure 7:
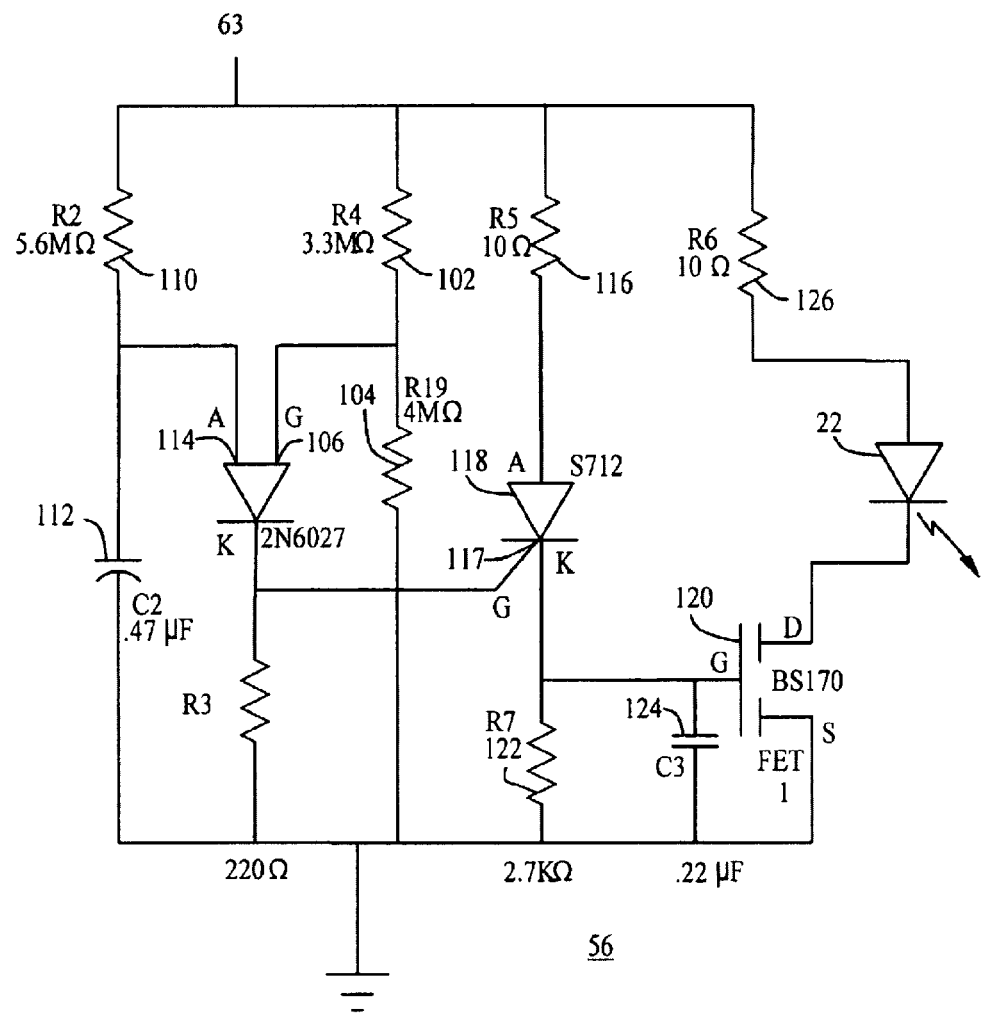
FIG. 7 is a diagram showing another part of the circuit of FIG. 5 in more detail.

FIG. 7 shows fault detect light control circuit 56. A function of circuit 56 is to cause light 22 to flash periodically during the display period for light 22.

When circuit 56 receives power from Vcc input 63, resistors 102 and 104 act as a voltage divider to supply a reference voltage to gate 106 of programmable unijunction transistor 108.

When circuit 56 receives power on Vcc input 63, the voltage on anode input 114 of transistor 108 rises, as capacitor 112 receives current via resistor 110. When the voltage on anode 114 reaches a certain value relative to the voltage on gate input 106, transistor 108 turns on, to supply a control signal to gate 117 of silicon control rectifier 118. Silicon control rectifier 118 thus turns on allowing current to flow to capacitor 124.

Thus, capacitor 124 receives current via silicon controlled rectifier 118 and resistor 116 to charge up and apply a voltage to the gate of FET 120, to turn on FET 120, allowing current to flow through light 22, which is a light emitting diode (LED).

After capacitor 112 discharges, causing transistor 108 to turn off, and causing silicon control rectifier 118 to turn off, capacitor 124 discharges through resistor 122, causing FET 120 to turn off, ending the pulse of light from light 22.

In other words, gate 106 of transistor 108 may be considered a first control input and the anode 114 may be considered a second control input. Current through resistor 110 charges anode 114. Subsequently, when transistor 108 turns on, current from the cathode of transistor 108 charges gate 117 of rectifier 118. The current output of rectifier 118 charges the gate of FET 120, causing FET 108 to turn on, to illuminate LED 22. Circuit 56 repeats the proceeding acts a plurality of times for each display period.

In other words, input 62 is a first node for coupling to Vcc (a first reference voltage), and the source of transistor 96 is a second node for coupling to ground (a second reference voltage). Reed switch 38 generates a reed switch signal. Circuit 51 and relay 54 are responsive to the reed switch signal, and generate a power signal on contact 48. Circuit 56 generates a light control signal for LED 22, in response to the power signal.

Reset circuit 58 acts to block the power signal after a period of time. Dip switch 66 is coupled between an end of capacitor 73 and Vcc. FET 96 and is also a type of switch. FET 96 is coupled between the end of capacitor 73 and ground. FET 96 is responsive to the reed switch signal.

Figure 8:
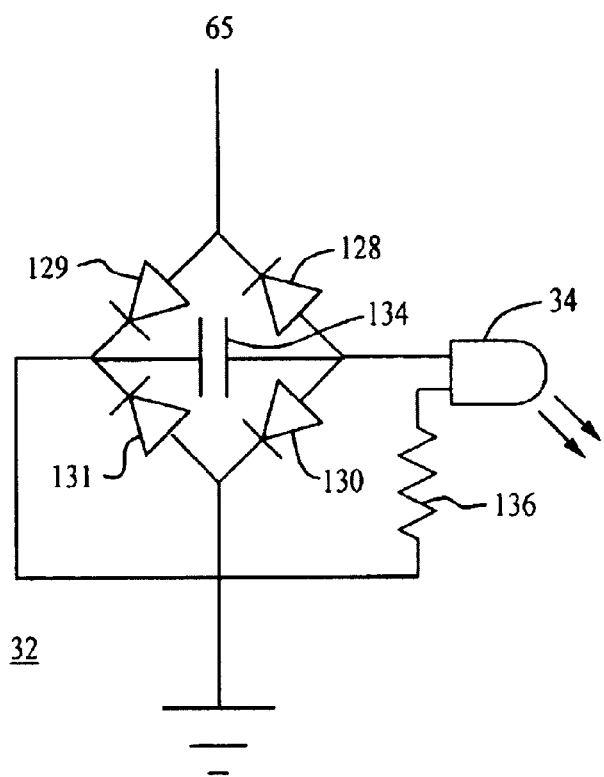
FIG. 8 is a diagram showing yet another part of the circuit of FIG. 5 in more detail.

FIG. 8 shows voltage detect light control circuit 32. When an AC current is flowing in cable 16, capacitive coupling between contact 19 and cable 16 induces a current into alternating current input 65 of circuit 32. Diodes 128, 129, 130, and 131 rectify this alternating current to charge 250 V, 0.12 microfarad capacitor 134, thereby powering light 34, which is a neon lamp. More specifically, when capacitor 134 reaches 135 volts, light 34 turns on (flashes), thereby partially discharging capacitor 134 through 15 kilo-ohm resistor 136 and light 34. Light 34 produces a light pulse for approximately 10 milliseconds. When light 34 turns off, as a result of reduced bias voltage across light 34, capacitor 134 begins to recharge, thus starting a new cycle.

Referring again to FIG. 5 and 6, reset circuit 58 may be manually activated by positioning a hand-held magnet in proximity switch 72. With reed switch 72 closed, silicon control rectifier 82 is shorted (bypassed), allowing current to flow through resistor 61, reset coil 60, and reed switch 72.

The orientation and position of reed switch 72 relative to cable 16 is such that the magnetic field generated by cable 16 will not close switch 72. Optimally, switch 72 is oriented parallel to the magnetic field from cable 16, as shown in FIG. 5. In FIG. 5, the magnetic field from cable 16 is parallel to a normal defined by the page.

Conversely, reed switch 38 is oriented and located such that it will be closed by the magnetic field generated by cable 16. Optimally, switch 38 is oriented perpendicular to the magnetic field form cable 16.

It is presently preferred that relay 54 be an AZ847 Micro Miniature Polarized Relay, manufactured by American Zettler, Inc., 75 Columbia Aliso Viejo, Calif. 92656.

It is presently preferred that programmable unijunction transistors 70 and 118 be model 2N6027 manufactured by Motorola Corporation.

Different types of test points may, or may not, be downstream from a common power source.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method for a power distribution system including a generation station and a plurality of control circuits each located away from the generation station, each control circuit including a first device with first and second control inputs, and a current output, a second device with a control input and a current output, and a third device with a control input and a current output for coupling to a light source, the method comprising the steps, performed for each control circuit, of:

detecting a current at a respective location in the power distribution system;

supplying voltage to the control circuit, in response to the detecting step, and the steps, performed a plurality of times in the control circuit, of charging the second control input of the first device;

subsequently using the current output of the first device to charge the control input of the second device; and using the current output of the second device to charge the control input of the third device.

2. The method of claim 1 wherein each control circuit further includes a relay having a set coil, and a discreet capacitor coupled to the set coil, and wherein the detecting step includes charging the capacitor; and passing current from the capacitor to the set coil, and wherein the supplying step includes closing the relay.

3. A method for a power distribution system having a plurality of conduction paths, and a plurality of devices each having a manual control and each located adjacent a conduction path, the method comprising the steps, performed in each device, of detecting a current in the adjacent conduction path;

activating an indicator in response to the detecting step; and deactivating the indicator after a period of time, the period of time being a function of the manual control, wherein the manual control in each device includes a switch, each device further includes a capacitor, and the deactivating step includes charging the capacitor through the switch.

4. A power distribution system having a plurality of conduction paths, and a plurality of devices, each device including a first node for coupling to a first reference voltage;

a second node for coupling to a second reference voltage;

a detector that detects a current in an adjacent conduction path to generate a first signal;

an activator, responsive to the first signal, for generating a second signal;

a control circuit that generates a third signal in response to the second signal;

an indicator responsive to the third signal; and a deactivator for blocking the second signal after a period of time, the deactivator including a capacitor coupling between the first and second nodes.

5. The power distribution system of claim 4 wherein the capacitor in each device includes a first end, and each device further includes a switch coupled between the first end and the first node.

6. The power distribution system of claim 4 wherein the capacitor in each device includes a first end, and each device further includes a first switch coupled between the first end and the first node; and a second switch coupled between the first end and the second node.

7. The power distribution system of claim 6 wherein the first switch is part of a manual control.

8. The power distribution system of claim 6 wherein the second switch is responsive to the first signal.

9. Circuitry for a power distribution system including a generation station and a plurality of first circuits each located away from the generation station, each first circuit including a first device with first and second control inputs, and a current output, a second device with a control input and a current output, and a third device with a control input and a current output for coupling to a light source, the circuitry comprising:

means for detecting a current at a respective location in the power distribution system;

means for supplying voltage to a first circuit, in response to the means for detecting, and the following elements, activated a plurality of times for the first circuit:

means for charging the second control input of the first device;

means for subsequently using the current output of the first device to charge the control input of the second device; and means for using the current output of the second device to charge the control input of the third device.

10. The circuitry of claim 9 wherein each first circuit further includes a relay having a set coil, and a discreet capacitor coupled to the set coil, and wherein the means for detecting includes means for charging the capacitor; and means for passing current from the capacitor to the set coil, and wherein the means for supplying includes means for closing the relay.

11. An indication system for a power distribution system including a generation station, the indication system comprising a plurality of first circuits each located away from the generation station, each first circuit comprising:

a first device with first and second control inputs, and a current output;

a second device with a control input and a current output, and a third device with a control input and a current output for coupling to a light source;

a detector that detects a current at a respective location in the power distribution system;

a voltage supply, responsive to the detector;

a charger that charges the second control input of the first device;

a first current path between the current output of the first device and the control input of the second device; and a second current path between the current output of the second device and the control input of the third device.

12. The indication system of claim 11 wherein each first circuit further includes a relay having a set coil, and a discreet capacitor coupled to the set coil, and wherein the and the detector passes current from the capacitor to the set coil.

13. Circuitry for a power distribution system having a plurality of conduction paths, and a plurality of devices each having a manual control and each located adjacent a conduction path, wherein the manual control in each device includes a switch, each device further includes a capacitor, the circuitry comprising:

means for detecting a current in the adjacent conduction path;

means for activating an indicator in response to the detecting means; and means for deactivating the indicator after a period of time, the period of time being a function of the manual control, the deactivating means acting to charge the capacitor through the switch.

14. A device for a power distribution system having a plurality of conduction paths, the device comprising:

a first node for coupling to a first reference voltage;

a second node for coupling to a second reference voltage;

a detector that detects a current in an adjacent conduction path to generate a first signal;

an activator, responsive to the first signal, for generating a second signal;

a control circuit that generates a third signal in response to the second signal;

an indicator responsive to the third signal; and a deactivator for blocking the second signal after a period of time, the deactivator including a capacitor coupling between the first and second nodes.

15. The device of claim 14 wherein the capacitor includes a first end, and the device further includes a switch coupled between the first end and the first node.

16. The device of claim 14 wherein the capacitor includes a first end, and the device further includes a first switch coupled between the first end and the first node; and a second switch coupled between the first end and the second node.

17. The device of claim 16 wherein the first switch is part of a manual control.

18. The device of claim 16 wherein the second switch is responsive to the first signal.

19. A method for a power distribution system having a plurality of conduction paths, the method comprising:

coupling a first node to a first reference voltage;

coupling a second node to a second reference voltage;

detecting a current in an adjacent conduction path to generate a first signal;

activating, responsive to the first signal, to generate a second signal;

generating a third signal in response to the second signal;

indicating responsive to the third signal; and blocking the second signal after a period of time, by using a capacitor coupled between the first and second nodes.

20. The method of claim 19 wherein the capacitor includes a first end, and the method further includes operating a switch coupled between the first end and the first node.

21. The method of claim 19 wherein the capacitor includes a first end, and the method further includes operating a first switch coupled between the first end and the first node; and operating a second switch coupled between the first end and the second node.

22. The method of claim 21 wherein the first switch is part of a manual control.

23. Circuitry for a power distribution system having a plurality of conduction paths, the circuitry comprising:

means for coupling a first node to a first reference voltage;

means for coupling a second node to a second reference voltage;

means for detecting a current in an adjacent conduction path to generate a first signal;

means for activating, responsive to the first signal, to generate a second signal;

means for generating a third signal in response to the second signal;

means for indicating responsive to the third signal; and means for blocking the second signal after a period of time, by using a capacitor coupled between the first and second nodes.

24. The circuitry of claim 23 wherein the capacitor includes a first end, and the circuitry further includes means for operating a switch coupled between the first end and the first node.

25. The circuitry of claim 23 wherein the capacitor includes a first end, and the circuitry further includes means for operating a first switch coupled between the first end and the first node; and means for operating a second switch coupled between the first end and the second node.

26. The circuitry of claim 25 wherein the first switch is part of a manual control.

* * * * *